US009193859B2

(12) United States Patent
Cordova

(10) Patent No.: US 9,193,859 B2
(45) Date of Patent: *Nov. 24, 2015

(54) PLAY MODELING DOUGH

(71) Applicant: Mattel, Inc., El Segundo, CA (US)

(72) Inventor: Abimael Cordova, La Mirada, CA (US)

(73) Assignee: Mattel, Inc., El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/157,801

(22) Filed: Jan. 17, 2014

(65) Prior Publication Data

US 2014/0200281 A1 Jul. 17, 2014

Related U.S. Application Data

(63) Continuation of application No. 13/309,076, filed on Dec. 1, 2011, now Pat. No. 8,633,269.

(60) Provisional application No. 61/418,538, filed on Dec. 1, 2010.

(51) Int. Cl.
| *C08L 53/00* | (2006.01) |
| *C08L 99/00* | (2006.01) |
| *C08L 3/04* | (2006.01) |
| *C08K 3/00* | (2006.01) |
| *C08K 5/00* | (2006.01) |
| *C08K 5/01* | (2006.01) |
| *C08K 5/11* | (2006.01) |

(52) U.S. Cl.
CPC .............. *C08L 53/00* (2013.01); *C08K 3/0033* (2013.01); *C08K 5/0008* (2013.01); *C08K 5/01* (2013.01); *C08K 5/11* (2013.01); *C08L 3/04* (2013.01); *C08L 99/00* (2013.01)

(58) Field of Classification Search
USPC ................................ 524/47, 52, 68, 448, 505
See application file for complete search history.

(56) References Cited

U.S. PATENT DOCUMENTS

| 2,025,123 A | 12/1935 | Rahbek |
| 2,578,105 A | 12/1951 | Taylor |
| 3,074,803 A | 1/1963 | McGowan, Jr. |
| 3,179,980 A | 4/1965 | Ryan |
| 3,393,890 A | 7/1968 | Lemelson |
| 3,590,749 A | 7/1971 | Burns |
| 3,607,794 A | 9/1971 | Abbotson et al. |
| 3,676,387 A | 7/1972 | Lindlof |
| 3,723,132 A | 3/1973 | Hodge |
| 3,741,706 A | 6/1973 | Conley |
| 3,843,827 A | 10/1974 | Lee |
| 3,886,112 A | 5/1975 | Watson |
| 3,925,567 A | 12/1975 | Abe |
| 3,982,032 A | 9/1976 | Koizumi |
| 3,989,790 A | 11/1976 | Bruner |
| 4,236,715 A | 12/1980 | Middlebrook |
| 4,257,613 A | 3/1981 | Meyer Thor Straten |
| 4,259,190 A | 3/1981 | Fahey |
| 4,361,508 A | 11/1982 | Bourland |
| 4,537,944 A | 8/1985 | Imai |
| 4,575,460 A | 3/1986 | Alapi |
| 4,690,829 A | 9/1987 | Usui |
| 4,877,566 A | 10/1989 | Cha |
| 4,891,400 A | 1/1990 | Schwabe |
| 5,066,017 A | 11/1991 | Kurland |
| 5,090,643 A | 2/1992 | Spears |
| 5,093,146 A | 3/1992 | Calandro |
| 5,147,665 A | 9/1992 | Furcsik |
| 5,157,063 A | 10/1992 | Wetherell |
| 5,171,766 A | 12/1992 | Mariano |
| 5,258,437 A | 11/1993 | Takeuchi |
| 5,364,892 A | 11/1994 | Miller |
| 5,395,873 A | 3/1995 | Mizoule |
| 5,429,834 A | 7/1995 | Addesso |
| 5,490,876 A | 2/1996 | Warmerdam |
| 5,498,645 A | 3/1996 | Mariano |
| 5,506,280 A | 4/1996 | Miller |
| 5,559,186 A | 9/1996 | Fujii |
| 5,571,546 A | 11/1996 | Kristinus |
| 5,573,981 A | 11/1996 | Sato |
| 5,597,593 A | 1/1997 | Lebensfeld |
| 5,703,160 A | 12/1997 | Dehennau |
| 5,972,092 A | 10/1999 | Cordova |
| 5,990,205 A | 11/1999 | Cordova |
| 6,083,127 A | 7/2000 | O'Shea |
| 6,134,856 A | 10/2000 | Khan et al. |
| 6,159,117 A | 12/2000 | Chan |
| 6,180,255 B1 | 1/2001 | Valentini et al. |
| 6,218,461 B1 | 4/2001 | Schwabe |

(Continued)

FOREIGN PATENT DOCUMENTS

| DE | 19519212 A1 | 11/1996 |
| DE | 19745700 A1 | 4/1999 |
| EP | 2196500 A1 | 6/2010 |
| FR | 2880944 A1 | 7/2006 |
| GB | 2040959 A | 9/1980 |
| GB | 2072682 A | 10/1981 |
| JP | 50032238 A | 3/1975 |
| JP | 4077352 A | 3/1992 |
| MX | 2003010235 A | 6/2005 |
| WO | 9420984 A1 | 9/1994 |
| WO | 99/09095 A1 | 2/1999 |

OTHER PUBLICATIONS

Search Report and Written Opinion from Corresponding PCT Application No. PCT/US2011/062867, mailed Jul. 20, 2012, 8 pages.

*Primary Examiner* — Vu A Nguyen

(74) *Attorney, Agent, or Firm* — Edell, Shapiro & Finnan, LLC

(57) ABSTRACT

The present invention is directed toward a play composition including a polymeric binder and oil. In an embodiment, the binder is a hydrogenated triblock copolymer including styrene. The oil is a mineral oil. The composition may further include a plasticizer, a release agent, and one or more fillers.

20 Claims, No Drawings

(56) References Cited

U.S. PATENT DOCUMENTS

| | | |
|---|---|---|
| 6,287,622 B1 | 9/2001 | Martinez-Serna Villagran |
| 6,348,534 B1 | 2/2002 | Bianco |
| 6,359,057 B1 | 3/2002 | Li |
| 6,503,994 B1 | 1/2003 | Nehren |
| 6,509,391 B2 | 1/2003 | Gothjaelpsen |
| 6,527,616 B1 | 3/2003 | Li |
| 6,533,637 B1 | 3/2003 | Liao |
| 6,558,730 B1 | 5/2003 | Gisaw et al. |
| 6,613,419 B2 | 9/2003 | Ohbayashi et al. |
| 6,791,817 B2 | 9/2004 | Allison et al. |
| 6,881,781 B1 | 4/2005 | Gamba |
| 6,933,344 B2 | 8/2005 | Shah |
| 7,081,498 B2 | 7/2006 | Moeller et al. |
| 7,135,330 B2 | 11/2006 | Ohtaka |
| 7,192,000 B2 | 3/2007 | Mak |
| 7,247,796 B2 | 7/2007 | Hagen et al. |
| 7,435,776 B2 | 10/2008 | Gu et al. |
| 7,470,203 B1 | 12/2008 | Stillinger |
| 7,551,419 B2 | 6/2009 | Pelrine et al. |
| 7,553,508 B1 | 6/2009 | Wainwright |
| 7,554,787 B2 | 6/2009 | Pelrine et al. |
| 7,563,830 B2 | 7/2009 | Errington |
| 7,700,151 B2 | 4/2010 | Paul et al. |
| 7,773,363 B2 | 8/2010 | Pelrine et al. |
| 7,861,657 B2 | 1/2011 | Danon et al. |
| 7,872,850 B2 | 1/2011 | Pelrine et al. |
| 2001/0021747 A1 | 9/2001 | Masubuchi et al. |
| 2003/0227959 A1 | 12/2003 | Balian et al. |
| 2003/0234462 A1* | 12/2003 | Pearce ............ 264/49 |
| 2004/0026863 A1 | 2/2004 | Cho |
| 2004/0048018 A1 | 3/2004 | Pearce |
| 2004/0151933 A1 | 8/2004 | Ajbani et al. |
| 2004/0224104 A1 | 11/2004 | de Vries et al. |
| 2006/0017198 A1 | 1/2006 | Koehl |
| 2006/0111015 A1 | 5/2006 | Chernick et al. |
| 2007/0100052 A1 | 5/2007 | Terry Lee |
| 2007/0290446 A1 | 12/2007 | Amick |
| 2008/0287575 A1 | 11/2008 | Terry Lee |
| 2009/0260742 A1 | 10/2009 | Schmatloch et al. |
| 2010/0271746 A1 | 10/2010 | Pelrine et al. |
| 2011/0110010 A1 | 5/2011 | Pelrine et al. |
| 2011/0193362 A1 | 8/2011 | Prahlad et al. |

* cited by examiner

PLAY MODELING DOUGH

CROSS REFERENCE TO RELATED APPLICATIONS

This application is a continuation of prior U.S. Non-Provisional patent application Ser. No. 13/309,076, filed Dec. 1, 2011, which is based upon and claims priority under 35 U.S.C. 119(e) to U.S. Provisional Patent Application Ser. No. 61/418,538, filed Dec. 1, 2010. The disclosures of U.S. Provisional Patent Application Ser. No. 61/418,538 and U.S. Non-Provisional patent application Ser. No. 13/309,076 are incorporated herein by reference in their entirety for all purposes.

FIELD OF THE INVENTION

The present invention is directed toward a play modeling dough for children and, in particular, toward an oil-based modeling dough composition including a thermoplastic copolymer binder.

BACKGROUND OF THE INVENTION

Play modeling dough compositions not only amuse children, but also aid in the development of manual skills, dexterity, and creativity. These dough compositions create malleable materials that may be manipulated and shaped by the child. Conventional dough compositions are typically water-containing formulations utilizing starch as a binder. Over time, the water in the composition evaporates, and the starch undergoes retrogradation, causing the dough to dry out and toughen. Consequently, conventional dough compositions have a tendency to flake, crack, shrink, and crumble, in addition to possessing poor plasticity.

Thus, it is desirable to provide a play modeling dough composition that resists drying, is easily malleable, and retains its color during use.

SUMMARY OF THE INVENTION

The present invention is directed toward a play composition including a polymeric binder and oil. In an embodiment, the binder is a hydrogenated triblock copolymer including styrene and the oil is a mineral oil. The composition may further include a plasticizer, a release agent, and one or more fillers.

DETAILED DESCRIPTION

The basic composition for the moldable dough of the present invention includes a polymeric binder and oil. Specifically, the moldable dough may be dough-based or a binder-based. The binder of the present invention is a thermoplastic triblock copolymer binder (A-B-A). Preferably, the polymer is a hydrogenated styrenic copolymer possessing a polystyrene content of up to about 35 wt % to provide desired elongation characteristics (the percent polystyrene may be tested before hydrogenation). The copolymer may be a linear copolymer. In an embodiment, the block copolymer may possess a styrene content of about 10 wt % to about 30 wt %, depending upon the composition of the midblock. In an embodiment, the binder is a styrenic block copolymer with a midblock of ethylene/butylene, namely, a styrene-etylene/butylene-styrene (SEBS) thermoplastic copolymer having a styrene content of about 30 wt % (e.g., Kraton® G1650, available from Kraton Polymers LLC, Houston, Tex.). In another embodiment, the binder is a styrenic block copolymer with a midblock of ethylene-ethylene/propylene, namely, a styrene-(ethylene-ethylene/propylene)-styrene (SEEPS) thermoplastic copolymer having styrene content of about 30 wt % (e.g., SEPTON 4044, 4055, and 4077, available from Kuraray Co., Ltd., Houston, Tex.). In still another embodiment, the binder is a styrenic block copolymer with a midblock of ethylene/propylene, namely, a styrene-ethylene/propylene-styrene (SEPS) thermoplastic copolymer having a styrene content of about 10-15 wt % (e.g., SEPTON 2063, available from Kuraray Co., Ltd., Houston, Tex.).

The copolymer binder may be present in the composition in an amount of about 2 wt % to about 60 wt %. In an embodiment, the amount of copolymer binder is present in an amount of about 3 wt % to about 15 wt %. By way of example, the copolymer binder is present in an amount of about 5 wt % to about 11 wt % (e.g., about 6 wt %). In another embodiment, the copolymer binder is present in an amount of about 35 wt % to about 55 wt %.

The oil may be white oil such mineral oil (liquid paraffin) and, in particular, light white mineral oil (e.g., Drakeol® 9 and 10, available from Calumet Specialty Products Partners, Indianapolis, Ind.). The oil may be present in an amount of about 4 wt % to about 80 wt %. The oil may form the largest component (by weight percent) of the composition. By way of example, the oil is present in an amount of about 40 wt % to about 70 wt %. In an embodiment, the oil is present in an amount of about 42 wt % to about 52 wt % (e.g., about 48 wt %). In another embodiment, the oil is present in an amount of about 60 wt % to about 80 wt % (e.g., about 70 wt %).

The modeling dough composition may further include a plasticizer effective to impart additional flexibility to the copolymer binder. In an embodiment, the plasticizer is a citric acid ester. By way of example, the citric acid ester is acetyltri-n-butyl citrate (e.g., Citrofol® BII, available from Jungbunzlauer Suisse AG, Basel Switzerland). The plasticizer may be present in an amount of about 3 wt % to about 10 wt % (e.g., about 4-8 wt %).

The play modeling dough composition of the present invention may also include a release agent. In an embodiment, the release agent may be a silicone compound. By way of example, the release agent is siloxane fluid such as polydimethylsiloxane (dimethicone) (e.g., Xiameter® 200 fluid, available from Dow Corning Corporation, Midland, Mich.). The release agent may be present in the dough composition in an amount of about 1 wt % to about 4 wt % (e.g., about 2 wt %).

The modeling dough composition of the present invention may further include one or more filler materials. The filler materials include starch, modified starch, plastic microspheres (hollow or solid), flour, talc, calcium carbonate, cellulose fibers, mica, clays, silicates, diatomaceous earth, and combinations thereof. By way of example, dough composition may contain one or more of the following: 0 wt % to about 25 wt % flour; 0 wt % to about 10 wt % modified starch (e.g., waxy starch derived from waxy maize); 0 wt % to 35 wt % diatomite; 0 wt % to about 5 wt % dry expanded plastic microspheres; and 0 wt % to about 10 wt % talc.

By way of specific example, the dough composition may include one or more of the following fillers: unbleached flour in an amount of about 5 wt % to about 18 wt %; modified starch (e.g., COLFLO 67, available from National Starch, Bridgewater, N.J.) in an amount of about 12 wt % or more (e.g., about 14 wt %); flux calcined diatomaceous earth (e.g., Celite® 281, available from World Minerals, Inc., Santa Barbara, Calif.) in an amount of about 3 wt % to about 16 wt %; plastic microspheres having a particle size of approximately 35-55 μm (e.g., Expancel® 461 DE 40 D25, available from Azko Nobel, Amsterdam, Netherlands) in an amount of about 1 wt % to about 3 wt % (e.g., about 1.5 wt %); hydrophobic silica having a particle size of approximately 5-15 μm (e.g., Dow Corning® VM-2270 Aerogel Fine Particles, available from Dow Corning, Midland, Mich.) in an amount of about 2 wt % to about 6 wt % (e.g., about 4 wt %); and talc in an amount of about 5 wt % to about 8wt % (e.g., about 6wt %).

The modeling dough composition of the present invention may also include additives such as preservatives, whitening agents (e.g., titanium dioxide), matting agents, fragrance, and/or colorants. By way of example, the preservative may include, but is not limited to, phenoxyethanol, methylparaben, ethylparaben, butlyparaben, propylparaben, isobutylparaben and combinations of two or more of the above. Typical colorants include FD&C Powder Series colorants (available from Sensient Technologies Corporation, Milwaukee, Wis.) and DayGlo® T-Series colorants (available from DayGlo Color Corporation, Cleveland, Ohio). Pigments such as yellow iron oxide, black iron oxide, brown iron oxide, and red iron oxide may also be utilized as the colorant. The formulation may further include luminescent pigments such as strontium oxide aluminate phosphorescent pigments (e.g., Luminova® G-300, available from United Mineral & Chemical Corp, Lyndhurst, N.J.), as well as thermochromic pigments (e.g., thermochromic ink, available from Pilot Ink Co., Ltd. Aichi, Japan). Typical matting agents include silica gels (e.g., synthetic amorphous silica gel such as Syloid®, available from WR Grace, Augusta, Ga.). Typical fragrances include scented or masking oils. Each of these additives is typically present in amounts less than about 5 wt %.

By way of specific example, the composition may include one or more of the following additives: about 0.05 wt %-about 1.5 wt % titanium dioxide; about 0.2 wt % methyl-4-hydroxybenzoate (e.g., Nipagin® M from Clariant International Ltd, Frankfurt, Germany); about 0.15 wt % propyl-4-hydroxybenzoate (e.g., Nipasol® M, available from Clariant International Ltd, Frankfurt, Germany); 2-pheoxyethanol (e.g., Phenoxetol®, available from Clariant International Ltd, Frankfurt, Germany) present in an amount of about 0.4 wt %; about 0.15 wt % ethyl-4-hydroxybenzoate (e.g., Nipasin A, available from Clariant International Ltd, Frankfurt, Germany); masking agent/fragrance (e.g., vanilla) present in an amount of about 0.05 wt % to about 0.10 wt %; and amorphous silica gel matting agent having a particle size of about 3 μm (e.g., Syloid® 244, available from WR Grace, Augusta, Ga.) present in an amount of about 1 wt %-2 wt %.

Thus, the base comonents of the modeling dough (i.e., oil and triblock copolymer binder) are provided in amounts effective to form dough that is moldable, extrudable, and highly resistant to drying. The dough composition further demonstrates improved plasticity, dry strength, and resistance to dry shrinkage compared to conventional (water containing) dough compositions.

Specific formulations of the modeling dough composition are provided in the following examples.

EXAMPLES

Regular Weight Nondrying Modeling Dough Composition

A regular weight, non-drying modeling dough was formed using the following formulation (Table I):

TABLE I

| Ingredient | Approximate Weight % |
|---|---|
| Light White Mineral Oil (Drakeol ® 10) | 51.45 |
| Calcined Diatomaceous Earth | 15.31 |
| Modified Starch | 14.24 |
| Flour (unbleached) | 5.65 |
| SEBS Copolymer Binder (Kraton ® 1650) | 5.29 |
| Acetyltributyl Citrate | 4.21 |
| Polydimethylsiloxane Fluid | 2.03 |
| Methylparaben (methyl 4-hydroxybenzoate) | 0.20 |
| Propylparaben (propyl 4-hydroxybenzoate) | 0.15 |
| Titanium Dioxide | 0.05 |
| Fragrance | 0.05 |
| Colorant (DayGlo ® T Series Pigments) | 1.35 |

To form the modeling composition, a jacketed mixing tank is charged with mineral oil. The acetyltributyl citrate and the SEBS binder are slowly added to the tank. The resulting mixture is then heated to approximately 120° C., being stirred constantly until the binder dissolves. The heat is disengaged and the mixture cooled to approximately 100° C. In a separate mixer, the diatomaceous earth, modified starch, pigments, and preservatives are combined, and then mixed for approximately five minutes until completely dispersed. While mixing, the release agent (polydimethylsiloxane) and fragrance are added. Once added, the previously prepared binder mixture is added to the diatomaceous earth mixture. The combined mixture is then mixed until the resulting composition is homogenous.

The resulting dough possesses a specific gravity of approximately 10 (e.g., 9.5-10.5, measured at 24° C.), a density of about 10 (e.g., 9.5-10.5, measured at 24° C.), and a durometer (Shore A) value of 45-75. The penetrometer measurement (5 seconds at 24° C.) of the dough is approximately 100 (e.g., 80-120). The dough is thermally conductive, becoming rigid at cold temperatures (temperatures of 15° C. or less), soft at warm temperatures (temperatures of 40° C. or more).

Lightweight Nondrying Modeling Dough Composition

Lightweight, nondrying modeling dough was formed using the following formulation (Table II):

TABLE II

| Ingredient | Approximate Weight % |
|---|---|
| Mineral Oil (Drakeol ® 10) | 67.79 |
| SEBS Copolymer Binder (Kraton ® 1650) | 10.25 |
| Acetyltributyl Citrate | 8.36 |
| Amorphous Silica Gel | 4.50 |
| Calcined Diatomaceous Earth | 3.50 |
| Polydimethylsiloxane Fluid | 2.10 |
| Dry Expanded Plastic Microspheres | 1.50 |
| Phenoxetol (2-phenoxyethanol) | 0.40 |
| Methylparaben (methyl 4-hydroxybenzoate) | 0.20 |
| Propylparaben (propyl 4-hydroxybenzoate) | 0.15 |
| Colorant (DayGlo ® T Series) | 1.25 |

To form the modeling composition, a jacketed mixing tank is charged with the mineral oil. The acetyltributyl citrate and the SEBS binder are added slowly. The resulting mixture is heated to approximately 120° C. under constant stirring until the binder is dissolved. The heat is disengaged and the mixture cooled to approximately 100° C. In a separate mixer, the diatomaceous earth, the silica gel, microspheres, colorant pigments, and preservatives are combined and then mixed for approximately five minutes until completely dispersed. During mixing, polydimethylsiloxane is added. Once added, the previously prepared binder mixture is added to the diatomaceous earth mixture. The combined mixture is mixed until the resulting dough is homogenous.

Photochromic Nondrying, Modeling Dough Composition

A photochromic, nondrying modeling dough composition was formed utilizing the following formulation (Table III):

TABLE III

| Ingredient | Approximate Weight % |
|---|---|
| Mineral Oil | 45.17 |
| Calcined Diatomaceous Earth | 13.60 |
| Modified Starch | 12.70 |
| Photochromic Powder | 10.00 |
| SEBS Copolymer Binder (Kraton ® 1650) | 5.80 |
| Flour (unbleached) | 5.10 |
| Acetyltributyl Citrate | 4.23 |
| Polydimethylsiloxane | 1.80 |
| Methylparaben (methyl 4-hydroxybenzoate) | 0.20 |
| Ethylparaben (ethyl 4-hydroxybenzoate) | 0.15 |
| Titanium Dioxide | 0.15 |
| Fragrance | 0.05 |
| Colorant (DayGlo ® T Series Pigments) | 1.05 |

To form the modeling composition, a jacketed mixing tank is charged with the mineral oil. The acetyltributyl citrate and the SEBS binder are added slowly. The resulting mixture is heated to approximately 120° C. under constant stirring until the binder is dissolved. The heat is disengaged and the mixture cooled to approximately 100° C. In a separate mixer, the diatomaceous earth, flour, modified starch, colorants, photochromic pigments, titanium dioxide, and preservatives are combined and then mixed for approximately five minutes until completely dispersed. During mixing, fragrance and polydimethylsiloxane are added. Once added, the previously prepared binder mixture is added to the diatomaceous earth mixture. The combined mixture is mixed until a homogenous dough forms.

Thermochromic Nondrying, Modeling Dough Composition

A thermochromic, nondrying modeling dough composition was formed utilizing the following formulation (Tables IV and V):

TABLE IV

| Ingredient | Approximate Weight % |
|---|---|
| Mineral Oil | 48 |
| Calcined Diatomaceous Earth | 14 |
| Modified Starch | 14 |
| SEBS Copolymer Binder (Kraton ® 1650) | 6 |
| Thermochromic Colorant | 6 |
| Flour (unbleached) | 5 |
| Acetyltributyl Citrate | 4 |
| Polydimethylsiloxane | 2 |
| Methylparaben (methyl 4-hydroxybenzoate) | 0.20 |
| Ethylparaben (ethyl 4-hydroxybenzoate) | 0.15 |
| Titanium Dioxide | 0.05 |
| Fragrance | 0.05 |

To form the modeling composition, a jacketed mixing tank is charged with the mineral oil. The acetyltributyl citrate and the SEBS binder are added slowly. The resulting mixture is heated to approximately 120° C. under constant stirring until the binder is dissolved. The heat is disengaged and the mixture cooled to approximately 100° C. In a separate mixer, the diatomaceous earth, flour, modified starch, thermochromic pigments, titanium dioxide, and preservatives are combined and then mixed for approximately five minutes until completely dispersed. During mixing, the polydimethylsiloxane and fragrance are added. Once added, the previously prepared binder mixture is added to the diatomaceous earth mixture. The combined mixture is mixed until a homogenous dough forms.

TABLE V

| Ingredient | Approximate Weight % |
|---|---|
| Mineral Oil | 44.35 |
| Flour (unbleached) | 18 |
| Calcined Diatomaceous Earth | 17.25 |
| SEBS Copolymer Binder (Kraton ® 1650) | 6.50 |
| Talc | 6.35 |
| Thermochromic Ink | 3.00 |
| Acetyltributyl Citrate | 3.50 |
| Polydimethylsiloxane | 1 |
| Colorant | 1.60 |
| Methylparaben (methyl 4-hydroxybenzoate) | 0.20 |
| Propylparaben (propyl 4-hydroxybenzoate) | 0.15 |
| Titanium Dioxide | 0.20-0.50 |
| Fragrance | 0.10 |

Luminescent, Nondrying Modeling Dough Composition

A luminescent, nondrying modeling dough composition was formed utilizing the following formulation (Table VI):

TABLE VI

| Ingredient | Approximate Weight % |
|---|---|
| Mineral Oil (Drakeol ® 10) | 70.35 |
| SEBS Copolymer Binder (Kraton ® 1650) | 9.96 |
| Acetyltributyl Citrate | 8.65 |
| Strontium Oxide Aluminate Pigment | 6.30 |
| Trimethylated silica gel | 4.20 |
| Methylparaben (methyl 4-hydroxybenzoate) | 0.20 |
| Propylparaben (propyl 4-hydroxybenzoate) | 0.15 |
| Fragrance | 0.05 |
| Colorant (DayGlo ® T Series) | 0.14 |

To form the modeling composition, a jacketed mixing tank is charged with the mineral oil. The acetyltributyl citrate and the SEBS binder are added slowly. The resulting mixture is heated to approximately 120° C. under constant stirring until the binder is dissolved. The heat is disengaged and the mixture cooled to approximately 100° C. In a separate mixer, the luminescent pigment, silica gel, colorant, and preservatives are combined and then mixed for approximately five minutes until completely dispersed. During mixing, fragrance is added. Once added, the previously prepared binder mixture is added to the pigment mixture. The combined mixture is mixed until the resulting dough is homogenous.

Additional exemplary of formulations of the nondrying dough composition in accordance with embodiments of the present invention are provided below, with reference to Tables VII-XI.

TABLE VII

| Ingredient | Approximate Weight % |
|---|---|
| Mineral Oil | 46-48 |
| Flour (unbleached) | 15-17 |
| Calcined Diatomaceous Earth | 14-19 |
| Copolymer Binder (Kraton ® 1650) | 6-7 |
| Acetyltributyl Citrate | 5 |
| Talc | 3-7 |
| Polydimethylsiloxane | 2 |
| Methylparaben | 0.20 |
| Propylparaben | 0.15 |

TABLE VII-continued

| Ingredient | Approximate Weight % |
| --- | --- |
| Titanium Dioxide | <0.40 |
| Colorant (DayGlo ® T Series) | <2 |

TABLE VIII

| Ingredient | Approximate Weight % |
| --- | --- |
| Mineral Oil | 73.50 |
| Copolymer Binder (Kraton ® 1650) | 10.40 |
| Acetyltributyl Citrate | 7.80 |
| Polydimethylsiloxane | 3.20 |
| Dry Expanded Plastic Microspheres | 2.20 |
| Methylparaben | 0.20 |
| Propylparaben | 0.15 |
| Colorant (DayGlo ® T Series) | 2.50 |

TABLE IX

| Ingredient | Approximate Weight % |
| --- | --- |
| Mineral Oil | 69.40 |
| Copolymer Binder (Kraton ® 1650) | 9.85 |
| Acetyltributyl Citrate | 7.40 |
| Polydimethylsiloxane | 3 |
| Flour (Unbleached) | 6 |
| Dry Expanded Plastic Microspheres | 1.50 |
| Methylparaben | 0.20 |
| Propylparaben | 0.15 |
| Colorant (DayGlo ® T Series) | 2.50 |

TABLE X

| Ingredient | Approximate weight % |
| --- | --- |
| Mineral Oil | 46-47 |
| Flour (Unbleached) | 15 |
| Flux Calcined Diatomaceous Earth | 14.50 |
| Copolymer Binder (Kraton ® 1650) | 6.50 |
| Modified Starch | 7 |
| Acetyltributyl Citrate | 5 |
| Polydimethylsiloxane | 2 |
| Methylparaben | 0.20 |
| Propylparaben | 0.15 |
| Titanium Dioxide Kowet | 0.50 |
| Fragrance | 0.45 |
| Colorant (DayGlo ® T Series) | 2.50 |

TABLE XI

| Ingredient | Approximate Weight % |
| --- | --- |
| Copolymer Binder (Kraton ® 1650) | 48 |
| Flux Calcined Diatomaceous Earth | 30 |
| Modified Starch | 8 |
| Mineral Oil | 4 |
| Acetyltributyl Citrate | 4 |
| Colorant (DayGlo ® T Series) | 4 |
| Titanium Dioxide Kowet | 1 |
| Antifoam (Dow ® FG-10) | 1 |

The dough formulations provided in Tables VI-XI were formed utilizing a process similar to that described for the formulation of Table I.

The above described formulations provide a water-free dough composition that was moldable, extrudable, and highly resistant to drying. The dough composition of the present invention demonstrates improved plasticity, dry strength, and resistance to dry shrinkage when compared to modeling dough compositions lacking the triblock polymer and oil formulation.

While the present invention has been described in detail and with reference to specific embodiments thereof, it will be apparent to one skilled in the art that various changes and modifications can be made therein without departing from the spirit and scope thereof. For example, the fillers may possess any size and shape suitable for its intended purpose. Thus, it is intended that the present invention covers the modifications and variations of this invention provided they come within the scope of the appended claims and their equivalents. The reference to weight percents includes the weight percent of the component in the completed dough, unless noted otherwise.

Although the disclosed inventions are illustrated and described herein as embodied in one or more specific examples, it is nevertheless not intended to be limited to the details shown, since various modifications and structural changes may be made therein without departing from the scope of the inventions. In addition, various features from one of the embodiments may be incorporated into another of the embodiments. Accordingly, it is appropriate that the invention be construed broadly and in a manner consistent with the scope of the disclosure.

Having described preferred embodiments, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A moldable dough composition resistant to drying, the composition including:
a binder comprising an A-B-A triblock copolymer;
at least one filler material selected from the group consisting of starch, modified starch, flour, diatomaceous earth, and mixtures thereof; and
an oil.

2. The dough composition of claim 1, wherein the at least one filler material comprises at least one of starch, modified starch, and flour.

3. The dough composition of claim 1, wherein the block copolymer binder is a styrenic block copolymer.

4. The dough composition of claim 3, wherein the block copolymer binder possesses a styrene content of about 35% or less.

5. The dough composition of claim 4, wherein the block copolymer binder is selected from the group consisting of a styrene-(ethylene/butylene)-styrene copolymer, a styrene-(ethylene-ethylene/propylene)-styrene copolymer, and a styrene-(ethylene/propylene)-styrene copolymer.

6. The dough composition of claim 1, wherein the block copolymer binder is a styrene-(ethylene-ethylene/propylene)-styrene thermoplastic copolymer having styrene content of about 30 wt %.

7. The dough composition of claim 1, wherein the block copolymer binder is a styrene-(ethylene/propylene)-styrene thermoplastic copolymer having a styrene content of about 10-15 wt %.

8. The dough composition of claim 1, wherein the binder is present in the composition in an amount of about 2 wt % to about 60 wt %.

9. A modable dough composition resistant to drying, the composition including:

a binding comprising an A-B-A triblock copolymer, wherein the binder is present in the composition in an amount of about 3 wt % to about 15 wt %;

at least one filler material selected from the group consisting of starch, modified starch, plastic microspheres, flour, diatomaceous earth, and mixtures thereof; and an oil.

10. The dough composition of claim 9, wherein the binder is present in the composition in an amount of about 3 wt % to about 10 wt %.

11. The dough composition of claim 9, wherein the binder is present in the composition in an amount of about 6 wt %.

12. The dough composition of claim 1 further comprising a plasticizer.

13. The dough composition of claim 9, further comprising a plasticizer, wherein the plasticizer comprises a citric acid ester.

14. The dough composition of claim 1, wherein the oil is present in an amount of about 4 wt % to about 80 wt %.

15. The dough composition of claim 1, wherein the oil is present in an amount of about 40 wt % to about 80 wt %.

16. A dough composition resistant to drying, the composition comprising:

a binder comprising an A-B-A triblock copolymer;

at least one filler material selected from the group consisting of starch, modified starch, plastic microspheres, flour, diatomaceous earth, and mixtures thereof; and an oil, wherein the oil is present in an amount of about 42 wt % to about 52 wt %.

17. The dough composition of claim 1, wherein the oil is a white mineral oil.

18. The dough composition of claim 1, wherein:

the block copolymer binder is selected from the group consisting of a styrene-(ethylene/butylene)-styrene copolymer, a styrene-(ethylene-ethylene/propylene)-styrene copolymer, and a styrene-(ethylene/propylene)-styrene copolymer, the styrene content of the block copolymer binder is up to about 35%;

the binder is present in the composition in an amount of about 3 wt % to about 15 wt %; and the oil comprises mineral oil present in the composition in an amount of about 40 wt % to about 70 wt %;

and the dough composition further comprises a plasticizer present in an amount of about 3 wt % to about 10 wt %.

19. The dough composition of claim 18, wherein:

the block copolymer binder possesses a styrene content of about 10 wt % to about 30 wt %, based on the weight of the polymer; and the plasticizer comprises a citric acid ester.

20. The dough composition of claim 16, wherein the binder is present in the composition in an amount of about 2 wt % to about 60 wt %.

* * * * *

UNITED STATES PATENT AND TRADEMARK OFFICE
CERTIFICATE OF CORRECTION

| | | |
|---|---|---|
| PATENT NO. | : 9,193,859 B2 | Page 1 of 1 |
| APPLICATION NO. | : 14/157801 | |
| DATED | : November 24, 2015 | |
| INVENTOR(S) | : Cordova | |

It is certified that error appears in the above-identified patent and that said Letters Patent is hereby corrected as shown below:

In The Specification

Column 3, line 51, change "comonents" to --components--;

Column 9, line 1, change "binding" to --binder--.

Signed and Sealed this
Twelfth Day of July, 2016

Michelle K. Lee
*Director of the United States Patent and Trademark Office*